US011900036B2

(12) United States Patent
Cruz

(10) Patent No.: US 11,900,036 B2
(45) Date of Patent: Feb. 13, 2024

(54) METHODS AND SYSTEMS FOR VERIFYING A PROPERTY OF AN INTEGRATED CIRCUIT HARDWARE DESIGN USING A QUIESCENT STATE

(71) Applicant: Imagination Technologies Limited, Kings Langley (GB)

(72) Inventor: Reinald Cruz, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/382,674

(22) Filed: Jul. 22, 2021

(65) Prior Publication Data

US 2022/0043954 A1    Feb. 10, 2022

(30) Foreign Application Priority Data

Jul. 22, 2020 (GB) ...................... 2011344

(51) Int. Cl.
*G06F 30/3323* (2020.01)
*G06F 119/16* (2020.01)
*G06F 119/12* (2020.01)

(52) U.S. Cl.
CPC ...... *G06F 30/3323* (2020.01); *G06F 2119/12* (2020.01); *G06F 2119/16* (2020.01)

(58) Field of Classification Search
CPC ............. G06F 30/3323; G06F 2119/12; G06F 2119/16
See application file for complete search history.

(56) References Cited

U.S. PATENT DOCUMENTS

2005/0138585 A1    6/2005 Cerny et al.

OTHER PUBLICATIONS

Anonymous, Integrated Circuit Design—Wikipedia, pp. 1-6 (2015).
Kern et al., "Formal Verification in Hardware Design: a Survey," ACM Transactions on Design Automation of Electronic Systems, vol. 4, pp. 123-193, 1999.
Eng et al., "A Lightweight Policy Enforcement System for Resource Protection and Management in the SDN-based Cloud," Computer Networks, vol. 161, pp. 68-81, 2019.
Pill et al., "Formal Analysis of Hardware Requirements," ACM/IEEE Design Automation Conference, pp. 821-826, 2006.
Baier et al; "Principles of Model Checking"; The MIT Press; Apr. 30, 2008; pp. 126-141, 257-270.
Banerjee et al; "Formal Verification of Modules under Real Time Environment Constraints"; Proceedings of the 17th International Conference on VLSI Design {VLSID'04}; Jan. 5, 2004; pp. 1-6.

*Primary Examiner* — Jack Chiang
*Assistant Examiner* — Aric Lin
(74) *Attorney, Agent, or Firm* — Potomac Law Group, PLLC; Vincent M DeLuca

(57) ABSTRACT

Methods and systems for verifying a property of an integrated circuit hardware design. The method includes formally verifying, using a formal verification tool, that the property is true for the hardware design under a constraint that an instantiation of the hardware design transitions to a quiescent state at a symbolic time.

19 Claims, 8 Drawing Sheets

METHODS AND SYSTEMS FOR VERIFYING A PROPERTY OF AN INTEGRATED CIRCUIT HARDWARE DESIGN USING A QUIESCENT STATE

BACKGROUND

Integrated circuit (IC) hardware designs are typically verified before an IC is manufactured in accordance with the hardware design. Verifying a hardware design generally includes verifying that an instantiation of the hardware design behaves as expected according to the specification for the IC. This may be referred to as functional verification of a hardware design.

A hardware design may be functionally verified, for example, by formal verification or simulation-based verification. Formal verification is a systematic process that uses a mathematical model of the hardware design and mathematical reasoning to verify the hardware design. In contrast, simulation-based verification is a process in which a hardware design is tested by applying stimuli to an instantiation of the hardware design and monitoring the output of the instantiation of the hardware design in response to the stimuli.

In formal verification, the hardware design is transformed into a mathematical model (e.g. a state-transition system, or a flow graph) to thereby provide an instantiation of the hardware design which can be tested to verify the hardware design, and formal properties to be verified are expressed using mathematical logic using a precise syntax or a language with a precise mathematical syntax and semantics.

Formal verification is performed using a formal verification tool (i.e. a software tool that is capable of performing formal verification of a hardware design). Formal verification tools include, but are not limited to, formal property checkers (which may also be referred to as formal model checkers) such as OneSpin 360 DV™, Mentor Graphics Questa® Formal Verification, Synopsys® VC Formal, Cadence® Incisive® Enterprise Verifier, and JasperGold®; and formal equivalence checkers such as Synopsys® HECTOR, and other logical equivalence checkers (LECs) and sequential logical equivalence checkers (SLECs).

Formal verification can improve controllability as compared to simulation-based verification. Low controllability occurs when the number of simulation test signals or vectors required to thoroughly simulate a hardware design becomes unmanageable. For example, a 32-bit comparator requires $2^{64}$ test vectors. This could, depending on the simulation tool used, take years to exhaustively verify by simulation-based verification. In contrast a 32-bit comparator can be exhaustively verified via formal verification in less than a minute.

While formal verification can be an effective method for exhaustively verifying properties of a hardware design, this is only true if the properties that are to be verified and the conditions under which the properties are verified are presented in such a manner that a formal verification tool can solve the mathematical problem presented thereby. Specifically, during formal verification of a hardware design the hardware design is represented as a mathematical model, the properties to be verified are also represented mathematically, and mathematical reasoning is used to determine if the properties are true for the hardware design based on the mathematical model. In other words, in formal verification the verification is presented as a mathematical problem to be solved. Some mathematical problems will be solvable within a reasonable amount of time by a formal verification tool whereas others will not. When a formal verification tool is able to solve the mathematical problem presented by the hardware design, the properties to be verified, and the conditions under which the properties are to be verified, then the formal verification is said to converge. When, however, a formal verification tool is unable to solve the mathematical problem presented by the hardware design, the properties to be verified and the conditions under which the properties are to be verified, then the formal verification does not converge, and no results are output, and the verification is inconclusive.

The embodiments described below are provided by way of example only and are not limiting of implementations which solve any or all of the disadvantages of known methods and systems for verifying an integrated circuit hardware design.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for verifying a property of an integrated circuit hardware design. The methods include formally verifying, using a formal verification tool, that the property is true for the hardware design under a constraint that an instantiation of the hardware design transitions to a quiescent state at a symbolic time.

A first aspect provides a computer-implemented method of verifying a property of an integrated circuit hardware design, the method comprising, at one or more processors: formally verifying, using a formal verification tool, that the property is true for the hardware design under a constraint that an instantiation of the hardware design transitions to a quiescent state at a symbolic time.

Formally verifying that the property is true for the hardware design under a constraint that an instantiation of the hardware design transitions to a quiescent state at a symbolic time may comprise: receiving quiescent logic that is configured to detect a quiescent trigger that occurs at a symbolic time, and in response to detecting the quiescent trigger, cause the instantiation of the hardware design to transition to a quiescent state; and linking the quiescent logic to the hardware design prior to performing the formal verification.

The quiescent trigger may be an event or a combination of events that: is detectable, will occur, and does not have a fixed timing such that it occurs at a symbolic time.

The quiescent trigger may be an event, or a combination of events, that occur in an instantiation of the quiescent logic.

The quiescent logic may define a new signal that begins in a first state, and, at the symbolic time, transitions to a second state; and the quiescent trigger is the new signal transitioning from the first state to the second state.

The quiescent logic may comprise an assumption statement that the new signal will not fall and an assumption statement that the new signal will rise.

The quiescent trigger may be an event, or a combination of events, that occur in an instantiation of the hardware design.

The quiescent logic may be configured to detect the quiescent trigger by monitoring one or more control signals and/or data signals of the instantiation of the hardware design.

The hardware design may be for a component configured to receive and process input transaction requests, and causing the instantiation of the hardware design to transition to the quiescent state may comprise transitioning the instantiation of the hardware design into a state in which the instantiation of the hardware design does not receive new input transaction requests but the instantiation of the hardware design is allowed to process any input transaction requests that have already been presented to the instantiation of the hardware design.

The quiescent logic may comprise an assumption statement that when the quiescent trigger occurs the instantiation of the hardware design does not receive any new input transaction requests.

The hardware design may be for a component that is configured to indicate that it is ready to receive a new input transaction request by placing a handshake signal in a predetermined state, and the quiescent logic may comprise an assumption statement that once the quiescent trigger occurs the handshake signal is not transitioned to the predetermined state.

The hardware design may be for a component configured to receive and process input transaction requests and the instantiation of the hardware design may be in a quiescent state when the instantiation is in a state where the instantiation will not be provided any new input transaction requests.

The symbolic time may be one of a plurality of finite times and the formal verification tool is configured to verify that the property is true when the symbolic time is each of the plurality of finite times.

The method may further comprise outputting one or more signals indicating whether the formal verification was successful.

The method may further comprise, in response to determining that the formal verification was not successful, modifying the hardware design to generate a modified hardware design.

The method may further comprise, in response to determining that the formal verification was not successful, outputting information indicating a state or sequence of states of the hardware design which causes the property to not be true.

The method may further comprise, in response to determining that the formal verification was not successful, modifying the hardware design based on the information indicating a state or sequence of states of the hardware design which causes the property not to be true to generate a modified hardware design.

The method may further comprise repeating the formal verification for the modified hardware design.

The method may further comprise, in response to determining that the formal verification was successful, manufacturing, using an integrated circuit manufacturing system, an integrated circuit according to the hardware design.

Manufacturing, using an integrated circuit manufacturing system, an integrated circuit according to the hardware design may comprise: processing, using a layout processing system, the hardware design so as to generate a circuit layout description of the integrated circuit; and manufacturing, using an integrated circuit generation system, the integrated circuit according to the circuit layout description.

When processed in an integrated circuit manufacturing system, the hardware design may configure the integrated circuit manufacturing system to manufacture an integrated circuit.

A second aspect provides a system for verifying a property of an integrated circuit hardware design, the system comprising: memory configured to store the hardware design; and one or more processors configured to formally verify, using a formal verification tool, that a property is true for the hardware design under a constraint that an instantiation of the hardware design will enter a quiescent state at a symbolic time.

An integrated circuit hardware design, when processed in an integrated circuit manufacturing system, configures the system to manufacture an integrated circuit. There may be provided a non-transitory computer readable storage medium having stored thereon an integrated circuit hardware design that, when processed in an integrated circuit manufacturing system, causes the integrated circuit manufacturing system to manufacture an integrated circuit.

There may be provided an integrated circuit manufacturing system comprising: a non-transitory computer readable storage medium having stored thereon an integrated circuit hardware design; a layout processing system configured to process the integrated circuit hardware design so as to generate a circuit layout description of an integrated circuit; and an integrated circuit generation system configured to manufacture the integrated circuit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
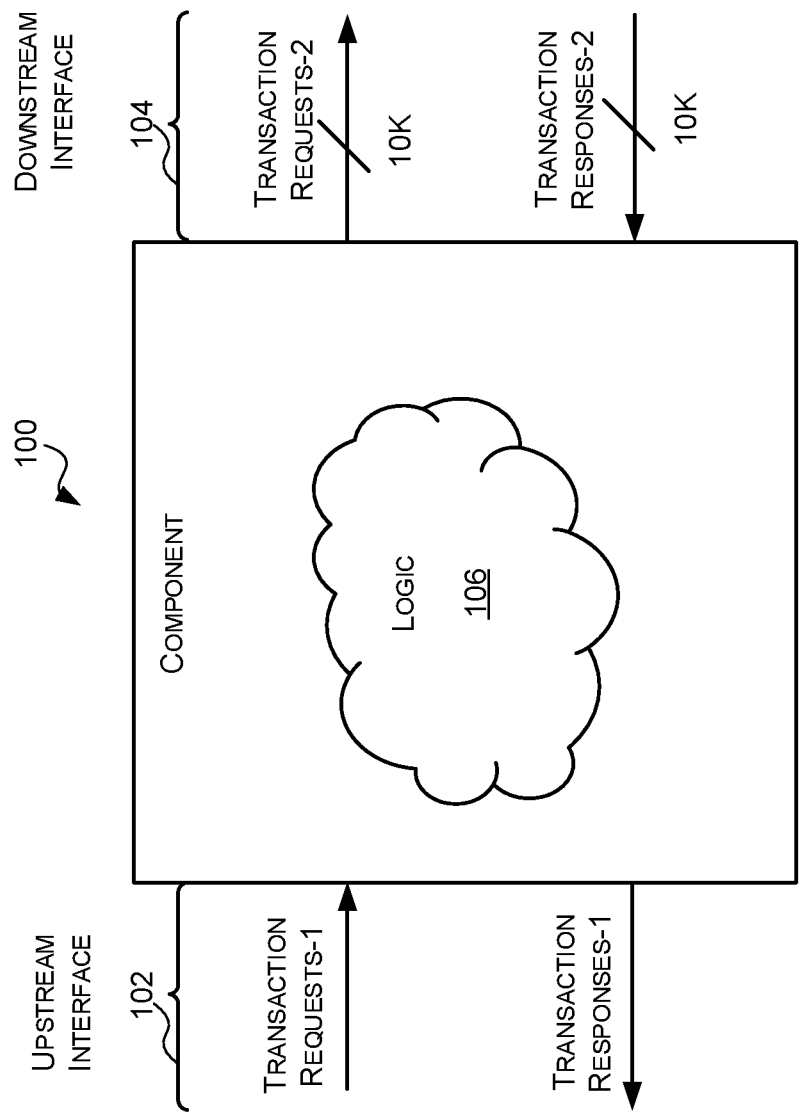
FIG. 1 is a schematic diagram of an example component that has multiple bi-directional buses.

The accompanying drawings illustrate various examples. The skilled person will appreciate that the illustrated element boundaries (e.g., boxes, groups of boxes, or other shapes) in the drawings represent one example of the boundaries. It may be that in some examples, one element

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

An integrated circuit hardware design, which may be referred to herein as a hardware design, is a description of the structure and/or function of an integrated circuit which, when processed at an integrated circuit manufacturing system, causes the integrated circuit manufacturing system to generate an integrated circuit described by the hardware design. For example, as described in more detail below with respect to FIG. 8, when a hardware design is processed at an integrated circuit manufacturing system the integrated circuit manufacturing system may generate an integrated circuit therefrom by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used, such as, but not limited to, proprietary high-level hardware description languages.

An instantiation of an integrated circuit hardware design is a representation of the integrated circuit and/or functionality of the integrated circuit defined by the hardware design. An instantiation of an integrated circuit hardware design includes, but is not limited to, an emulation model of the hardware design that simulates the behaviour of the integrated circuit defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

As is known to those of skill in the art, a property is a statement or expression that captures design behaviour. For example, a simple property may be a=b. Within HDL designs, a property is an executable statement that checks for specific behaviour within the HDL design. For example if a design contains a FIFO (first in first out) buffer a property may be that neither overflow nor underflow of the FIFO may occur. Properties are used to capture required or desired temporal behaviour of the hardware design in a formal and unambiguous way. The design can then be verified to determine that it conforms to the required or desired behaviour as captured by one or more properties. Since properties capture the design behaviour on a cycle-by-cycle basis they can be used to verify intermediate behaviours.

While formal verification can be an effective method for exhaustively verifying properties of a hardware design, properties of hardware designs for complex components which have multiple bi-directional buses, deep buffers and/or finite state machines (FSM) are significantly more complex to verify via formal verification due to multiple dependencies on the response transactions which lead to circular dependencies. An example of such a component 100 is shown in FIG. 1. The example component 100 comprises an upstream interface 102 which receives transaction requests (Transaction Requests-1) and sends transaction responses (Transaction Responses-1), a downstream interface 104 which sends transactions requests (Transaction Requests-2) and receives transaction responses (Transaction Responses-2), and logic 106 for processing the transaction requests and responses.

When a component generates an output in response to a set of one or more inputs the component is said to execute a transaction. The set of one or more inputs that cause a component to execute a transaction is referred to herein as a transaction request. The set of one or more inputs that form a transaction request will depend on the configuration of the component. For example, if a component is configured to calculate the sum of two inputs a and b, then the inputs a and b may form a transaction request. In contrast, if a component is configured to receive requests to read memory, then the address to be read may form a transaction request. The inputs that form a transaction request may be received at the component in the same cycle or in different cycles—e.g. a and b may be received in the same cycle, or a may be received in one cycle and b may be received in a subsequent cycle. The one or more outputs that a component generates in response to a transaction request is referred to herein as a transaction response.

One of the problems with formally verifying a property of a hardware design for a complex component, such as the component 100 of FIG. 1, is that because the response to a transaction request on the upstream interface 102 is dependent on multiple items, such as, but not limited to, the order and priority of transaction requests the component 100 receives, the order that the downstream component(s) processes requests etc., it may take a long time for the component to process a transaction request which may lead to circular dependencies. This is difficult for a formal verification tool to deal with because it is complex to track a request and its response, particularly over a long period of time. Furthermore, because formal verification tools will exhaustively test all permutations and combinations, the proof on the ordering dependencies of the transaction responses output on the upstream interface 102 (e.g. Transaction Responses-1) based on transaction responses received on the downstream interface 104 (e.g. Transaction Responses-2) can be dragged by the formal verification tool exploring a very deep reordering condition and latency combinations.

This problem of circular dependencies can be further explained by way of a cache controller that is configured to receive multiple read requests from multiple masters or requestors; arbitrate the requests internally; and generate cache linefill requests to memory out of order. The objective of formally verifying a hardware design for such a cache controller may be to verify that any request will receive its corresponding response. Let there be a set of requests R1 to Rx from a first master and a set of requests S1 to Sx from a second master. Because a formal verification tool will try all possible reordering patterns of the requests, the linefill request for R1 can get buried in that reordering behaviour by the almost never ending new requests from the first and second requestors. Constraining the number of requests that any requestor may make can reduce the complexity of the formal verification, but does not allow exhaustive verification which reduces the quality of such a verification. In a similar manner, setting a finite threshold on the reordering also does not allow exhaustive verification, which again reduces the quality of such verification.

Techniques known to the Applicant, which is not an admission that such techniques are known outside the Applicant company or are well known, to solve this problem have included using a watched window (i.e. only verifying the hardware design for a specific window of time) or scaling down the buffer sizes. While these techniques may alleviate the complexity of the proof, they may not allow exhaustive verification of a property over the entire state space and/or may be difficult to implement efficiently. Specifically, the confidence of arriving at full proof convergence using a watched window technique is inversely proportional to the length of the window because the complexity of the proof increases with the length of the window. Furthermore, the window does not guarantee that all dependencies with in-flight transaction requests were satisfied over that window.

Figure 2:
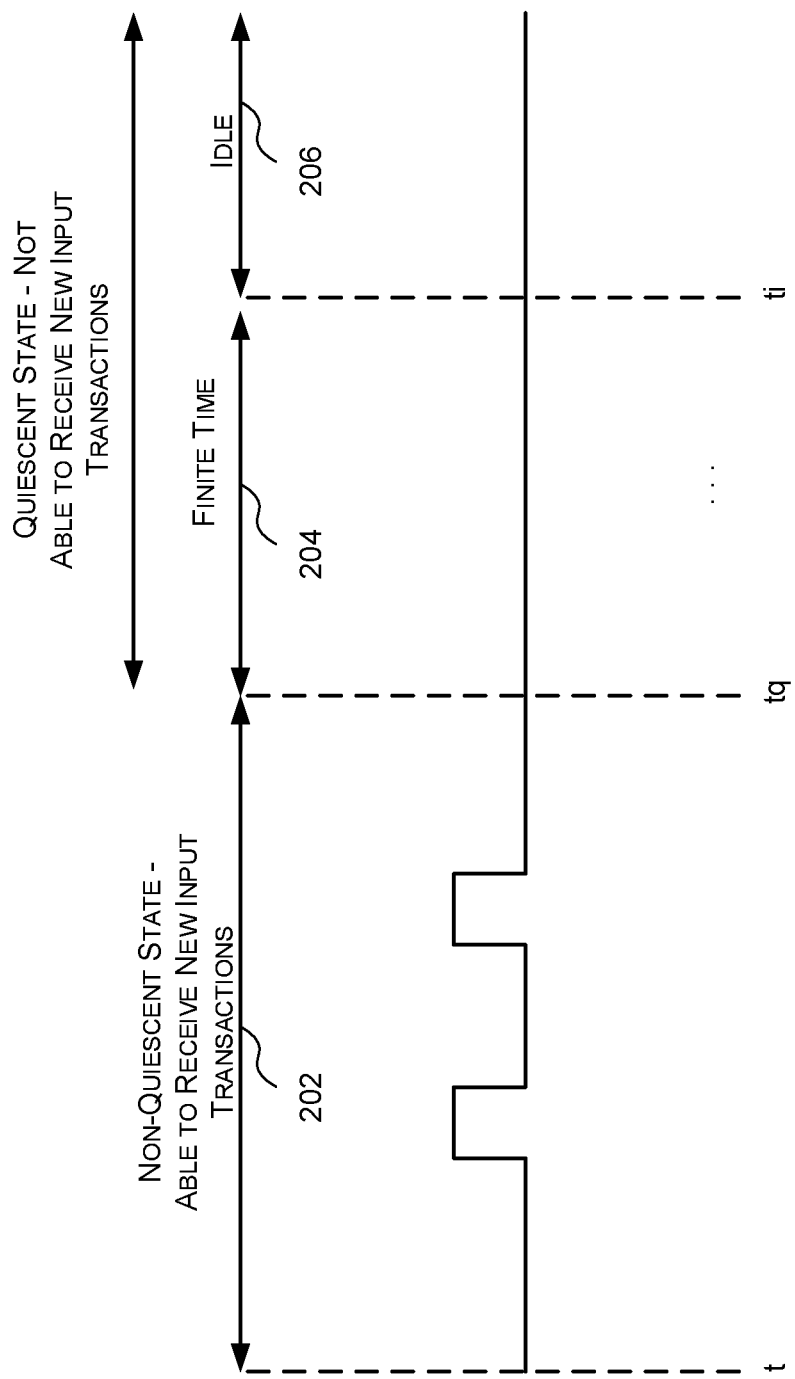
FIG. 2 is a schematic diagram illustrating transitioning an instantiation of a hardware design to a quiescent state.

Accordingly, described herein are methods and systems for verifying a property of an integrated circuit hardware design wherein the property of the integrated circuit hardware design is formally verified by a formal verification tool under a constraint that an instantiation of the hardware design will transition to a quiescent state at a symbolic time. The concept of transitioning an instantiation of the hardware design to a quiescent state at a symbolic time is illustrated in FIG. 2 where the instantiation of the hardware design begins at time t in a state (e.g. a non-quiescent state) in which the instantiation of the hardware design is receiving new input transaction requests, and then at a symbolic time (tq) the instantiation is transitioned to a quiescent state where it is no longer receiving new transaction requests. The time between t and tq 202 where the instantiation is able to receive new input transactions may be referred to as a non-quiescent time period. Performing the formal verification under such a constraint ensures that all possible proofs and state space exploration is finite. In this manner circular dependencies are avoided.

A quiescent state is a state of inactivity or dormancy. In the context of this application an instantiation of a hardware design is said to be in a quiescent state if the instantiation is in a state where it is no longer receiving new input transaction requests. Transitioning an instantiation of a hardware design to a quiescent state ensures that within a finite time (204 of FIG. 2) the instantiation will process (i.e. output a response for) all received input transaction requests (e.g. it will reach an idle state 206 as shown in FIG. 2). This is akin to a ride sharing program driver who is continuously picking up and dropping off passengers. If the driver stops picking up passengers, he/she will, within a finite amount of time, drop off all of his/her passengers.

For example, if an integrated circuit hardware design is for an out-of-order central processing unit (CPU) load-store unit which receives requests from multiple pipeline masters and, in response to each request, performs a read of, or write to, either a cache or external memory, the property that is verified may be that each request is executed by the load-store unit. When the load-store unit sends a read request to external memory the load-store unit may use a unique memory request ID to keep track of the requests and different read requests may have different latencies. If the load-store unit has a finite cache size and internal buffer, during formal verification of the property, an instantiation of the hardware design can end up in one of a plurality of scenarios where there is potentially long delays and multiple reorderings of the requests introduced by the formal verification tool (e.g. a response for request1 may be processed after multiple subsequent requests). If the load-store unit stops receiving requests (e.g. it is put into a quiescent state) then the load-store unit will eventually process request1. However, if the load-store unit continues to receive new requests, which are given priority over request1, it may be a long time before the load-store unit processes request1. In the real world, this is similar to computer lag, or a frozen screen. If the user stops providing input (e.g. pressing keys) the computer will start working again. However, if the user continues to provide input (e.g. tapping the keys) the computer will just lag or freeze further and further.

As is known to those of skill in the art, a symbolic variable (which may also be referred to as a symbolic constant) is a variable that can have a plurality of possible values (or a plurality of sets of values). During formal verification of a property of a hardware design comprising a symbolic variable, the symbolic variable has a constant value or set of values, but the formal verification tool verifies the property is true for each possible value (or each possible set of values) for the symbolic variable. Accordingly, a symbolic time variable can be used to represent all possible times. Accordingly, a formal verification tool that is configured to verify a property of a hardware design under a constraint that the instantiation of the hardware design is transitioned to a quiescent state at a symbolic time will verify that the property is true when the instantiation is transitioned to a quiescent state at each possible time.

Verifying a property under such a constraint verifies the property for the hardware design for a series of finite non-quiescent time periods. As described above, a non-quiescent time period is a period where an instantiation of the hardware design can receive new input transaction requests. While an integrated circuit might operate 24/7, such an integrated circuit will eventually go into an idle state (even if this idle state is a mere 1 clock cycle). Accordingly, the operation of such an integrated circuit can be described as a sequence of finite non-quiescent time periods (which will have been verified) and idle periods. Thus verifying a property for all of the finite non-quiescent time periods, up to a point where the component becomes idle, verifies all potential scenarios.

Testing has shown that formally verifying a property of an integrated circuit hardware design for a complex component in accordance with the methods and systems described herein can reduce the state space that is searched and the run time significantly. In some cases, using the methods and/or systems described herein for formally verifying a property of an integrated circuit design for a complex component has led to a full proof convergence for properties that previously did not converge. Although it has been stated that the methods and systems described herein can solve some of the problems related to formally verifying properties of integrated circuit hardware designs for complex components (e.g. components with multiple bi-directional buses, deep buffers etc.), it will be evident to a person of skill in the art that the use of the methods and systems described herein is not limited to verifying properties of integrated circuit hardware designs for complex components and that the methods and systems described herein can be used to verify a property of any hardware design. That said, the benefits of using the methods and systems described herein are likely to be most pronounced for integrated circuit hardware designs for components with handshake, pushback and/or credit interfaces; and for components with deep buffers and/or pipeline controls. Furthermore, generally, the simpler the hardware design under test, the less pronounced the benefits of using the described methods and systems may be.

Figure 3:
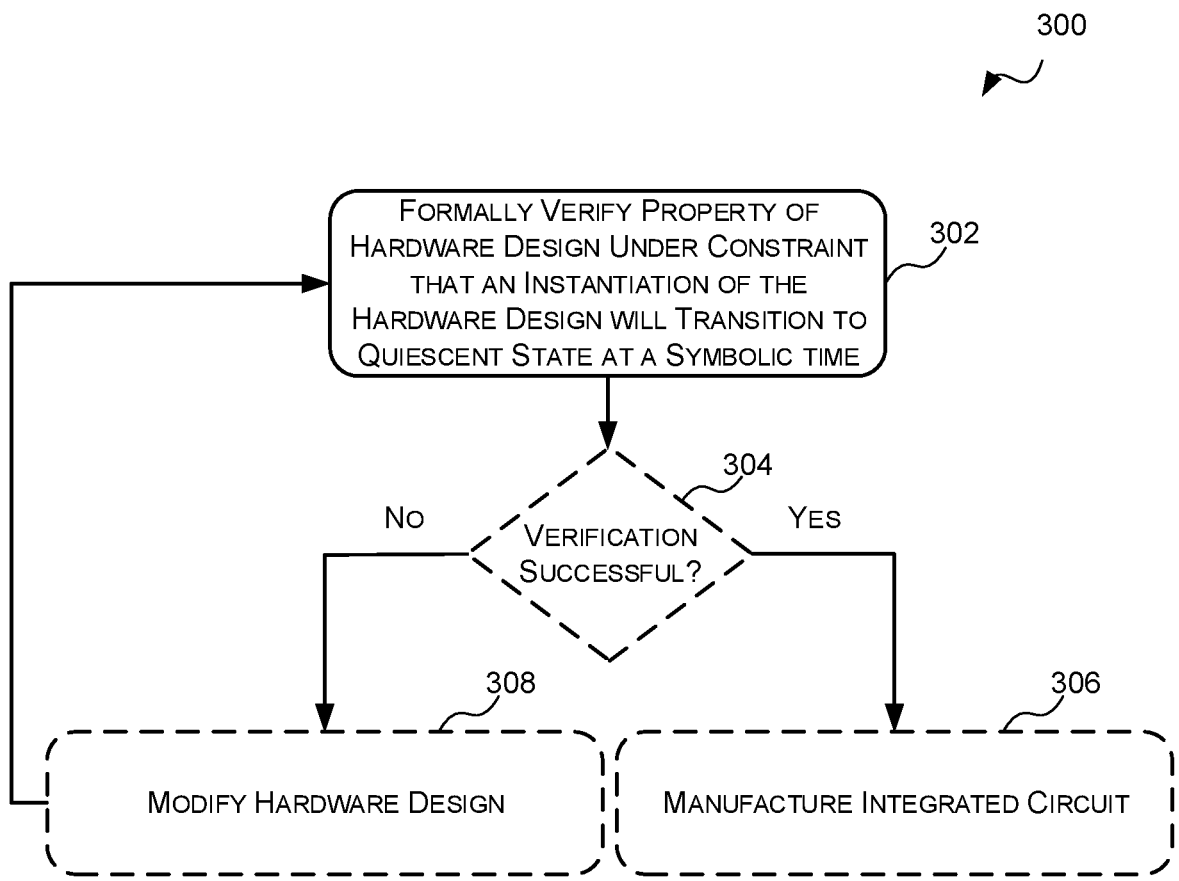
FIG. 3 is a flow diagram of an example method of verifying a property of an integrated circuit hardware design using a quiescent state.

Reference is now made to FIG. 3 which illustrates an example method 300 for verifying a property of an integrated circuit hardware design. The method 300 may be implemented by a computing-based device such as, but not limited to, the computing-based device 600 described below with respect to FIG. 6. For example, there may be a computer readable storage medium having stored thereon computer readable instructions that, when executed at a computing-based device, cause the computing-based device to perform the method 300 of FIG. 3.

The method 300 begins at block 302 where it is formally verified, using a formal verification tool, that the property is true for the hardware design under a constraint that an instantiation of the hardware design transitions to a quiescent state at a symbolic time. The property that is verified may be any property of the hardware design, such as, but not limited to, a property that is set out in the specification for the hardware design. For example, if as described above, the integrated circuit hardware design is for an out-of-order CPU load-store unit which receives requests from multiple pipeline masters, and in response to each request, performs a read of, or write to, either a cache or memory, the property that is verified may be that the load-store unit processes all received requests.

In some cases, formally verifying a property is true for a hardware design may comprise receiving or generating one or more assertions which set out the property to be verified; receiving or generating quiescent logic which is configured to implement or impose the constraint; linking the assertion(s) and the quiescent logic to the hardware design; and formally verifying, using a formal verification tool, that the assertion(s) are true or hold for the hardware design under the constraint; and outputting one or more signals indicating whether the assertion(s) were successfully verified.

An assertion, which also may be referred to as a lemma, is a statement that a particular property is expected to hold for a hardware design (i.e. is always true). An assertion of the form "assert property [evaluable expression]" is said to "assert" the property specified by the "evaluable expression". If an asserted property (e.g. the evaluable expression) is evaluated to be false for the hardware design for any valid input the hardware design is not behaving as expected and there is an error. For example, in the example assertion "assert property a=b"; if a is not equal to b at any point then the hardware design is not behaving as expected and there is an error.

Assertions are used to capture required temporal and combinational behaviour of an instantiation of a hardware design in a formal and unambiguous way. The hardware design can then be verified to determine that an instantiation thereof conforms to the requirement as captured by the assertion(s). Since assertions capture the instantiation behaviour on a cycle-by-cycle basis they can be used to verify intermediate behaviours.

Assertions are typically expressed in an assertion language. An assertion language, which may also be referred to as a property language, captures the hardware design behaviour spread across multiple hardware design cycles (e.g. clock cycles) in a concise, unambiguous manner. While traditional hardware description languages (HDL), such as an RTL language, have the ability to capture individual cycle behaviour, they are too detailed to describe properties at a higher level. In particular, assertion languages provide means to express temporal relationships and complex hardware design behaviours in a concise manner. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

The quiescent logic is a software module configured to, when linked to the hardware design, implement or impose the constraint that an instantiation of the hardware design transitions to a quiescent state at a symbolic time. In some cases, the quiescent logic may be implemented or expressed in an assertion language, or a property language. In some cases, the quiescent logic is configured to detect a quiescent trigger that occurs at a symbolic time, and in response to detecting the quiescent trigger, transition the instantiation of the hardware design to a quiescent state (e.g. a state in which the instantiation of the hardware design is not provided any new transaction requests to process).

In some cases, the quiescent logic may comprise trigger logic and transition logic. The trigger logic is configured to monitor one or more control and/or data signals of an instantiation of the hardware design or an instantiation of the quiescent logic and detect a quiescent trigger when it detects, from the monitored control and/or data signal(s) a predetermined event or combination of events. The transition logic is configured to, upon the trigger logic detecting a quiescent trigger, transition the instantiation of the hardware design to a quiescent state.

The quiescent trigger may be any event, or combination of events, in an instantiation of the hardware design or an instantiation of the quiescent logic that is: detectable, will definitely occur, and does not have a fixed timing such that the timing of the quiescent trigger is variable (e.g. symbolic). In some cases, the quiescent trigger may be an event, or combination of events, that occurs in an instantiation of the hardware design. In these cases, the trigger logic may be configured to monitor one or more control and/or data signals of the instantiation of the hardware design to detect when the quiescent trigger has occurred. For example, if the hardware design is configured such that an instantiation thereof will receive input transaction requests comprising a payload, a first payload A may be defined, and a second payload B may be defined and the quiescent trigger may be defined as the occurrence of two successive input transaction requests with payloads A and B respectively. In these cases, the trigger logic may be configured to monitor the payload of input transaction requests and when the trigger logic detects two successive input transaction requests with payloads A and B respectively detect a quiescent trigger. Since the time at which the two input transaction requests will occur in succession are not specified, the two input transaction requests will occur in succession at a symbolic time. Specifically, during formal verification of a property of a hardware design linked to such trigger logic, the formal verification tool will verify that the property is true for all combinations of input transaction requests and payloads thereof, thus verifying the property is true for all possible times that input transaction requests with the specified payloads occur sequentially. Using one or more events or combination of events that occur in an instantiation of the hardware design as the quiescent trigger may be referred to herein as an intrusive quiescent trigger.

In other cases, the quiescent trigger may be a new event that is created by the quiescent logic. For example, the trigger logic may be configured to define a new signal that starts low, for example, and rises at some point. The quiescent trigger may then be defined as the transition of the new signal from low to high. In these cases, the trigger logic may be configured to monitor the new signal and when the trigger logic detects that the new signal transitions from low to high may detect a quiescent trigger. As the specific time that the new signal will transition from low to high is not specified, the new signal will transition from low to high at a symbolic time. During formal verification of a property of hardware design linked to such trigger logic, the formal verification tool will verify that the property is true for all possible times that the new signal may transition from low to high. Using one or more events of an instantiation of the quiescent logic (e.g. trigger logic) itself (as opposed to an instantiation of the hardware design) as the quiescent trigger may be referred to herein as a non-intrusive quiescent trigger.

As described above, the transition logic may be configured to transition the instantiation of the hardware design to a quiescent state upon the trigger logic detecting a quiescent trigger. Transitioning an instantiation of the hardware design to a quiescent state may comprise transitioning the instantiation of the hardware design to a state in which the instantiation does not receive any new input transaction requests, but is allowed to process any input transaction requests that have already been presented to the instantiation in a non-retractable manner. The manner in which the transition logic transitions an instantiation of the hardware design to a state in which it will not receive any new transaction requests will vary based on the hardware design. Specifically, the combination of signals and/or configuration options which cause an instantiation of a hardware design to stop receiving new input transaction requests will vary between hardware designs.

For example, if the hardware design describes a component that is configured to indicate that it is ready to receive a new input transaction request when it pulls a handshake valid signal high, the transition logic may be configured to, upon the trigger logic detecting the quiescent trigger, not allow the handshake valid signal to transition from low to high. This will allow the handshake valid signal to stay high if it is high so as to allow the instantiation of the hardware design to process any input transaction requests that are in progress, but once the handshake valid signal is low it will have to stay low. It will be evident to a person of skill in the art that this is an example only and that the transition logic may be configured to transition an instantiation of the hardware design into a quiescent state in any suitable manner. Example implementations of quiescent logic are described below.

Once the assertion(s) and the quiescent logic have been generated/received, the assertion(s) and the quiescent logic are linked to the hardware design. The assertion(s) and the quiescent logic may be linked to the hardware design by incorporating the assertion(s) and the quiescent logic into the hardware design; or binding the assertion(s) and the quiescent logic to the hardware design using known methods. Specifically, the assertion(s) and the quiescent logic may be bound to the relevant signals of the hardware design so that the relevant signals thereof can be monitored. Once the hardware design has been linked to the assertion(s) and the quiescent logic, the hardware design, assertion(s) and quiescent logic are treated as one design by the formal verification tool. In other words, linking the assertion(s) and the quiescent logic to the hardware design effectively imports the assertion(s) and quiescent logic into the hardware design.

Once the assertion(s) and the quiescent logic have been linked to the hardware design, the hardware design, the assertion(s), the quiescent logic and the bindings (if any) are loaded into a formal verification tool and the formal verification tool is configured to verify that the assertion(s) are true for the hardware design under the constraint(s) imposed by the quiescent logic.

An assertion is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability. Since formal verification of a property algorithmically and exhaustively explores all input values (as defined by one or more constraints) over time, verifying a property in this manner allows a property to be exhaustively proved or disproved for all valid states.

When a formal verification tool is used to verify an assertion, the formal verification tool may output an indication of whether or not the assertion is valid (i.e. the asserted property is true for all valid states or sequences of states), which may also be referred to herein as the assertion being successfully verified. The output may be yes, the assertion is valid or has been successfully verified; no, the assertion is not valid (i.e. the asserted property it is not true or has failed for at least one valid state or sequence of states) or has not been successfully verified; or the formal verification was inconclusive. The formal verification may be inconclusive, for example, because the computing-based device running the formal verification tool has run out of memory or because the formal verification tool has determined that a certain amount of progress has not been made after a predefined period of time.

Where an assertion is not valid or has not been successfully verified, the formal verification tool may also output information indicating a state or sequence of states of the hardware design which causes the asserted property to fail, which may be referred to as a counter-example. For example, the formal verification tool may output a trace of the verification indicating at what point, state or sequence of states the failure occurred.

Once the formal verification has ended (either because the formal verification tool has proved the assertion to be true for the hardware design, the formal verification tool has determined that the assertion is not true for the hardware design (e.g. the formal verification has identified a counter-example), or the formal verification was inconclusive) the method 300 proceeds to block 304.

At block 304, a determination is made as to whether the verification of the property of the hardware design was successful. As described above, when a formal verification tool is used to verify an assertion for a hardware design, the formal verification tool may output a signal or a set of signals that indicates whether or not the assertion is valid (i.e. the asserted property is true for all valid states or sequence of states).

If it is determined that the verification of the property was successful (indicating that the property is true for the hardware design) the method 300 may proceed to block 306 where an integrated circuit described by the hardware design is manufactured. If, however, it is determined that the verification of the hardware design was not successful (indicating that there is an error in the hardware design) then the method 300 may proceed to block 308 where the hardware design is modified to correct the error in the hardware design that caused the unexpected behaviour. As described above, when the verification of an assertion is not successful the formal verification tool may output information indicating a state or sequence of states of an instantiation of the hardware design which cause the assertion to fail (i.e. a counter-example). In these cases, the modification may be based on the information indicating the state or sequence of states which cause the assertion to fail. Once the hardware design has been modified the modified hardware design may be re-verified (e.g. block 302 may be repeated for the modified hardware design).

First Example Quiescent Logic

As described above, the quiescent logic is configured to detect a quiescent trigger that occurs at a symbolic time; and in response to detecting the quiescent trigger, transition the instantiation of the hardware design to a quiescent state (e.g. a state in which the instantiation no longer receives new input transaction requests). In a first example, the quiescent logic (e.g. the trigger logic) is configured to define a new signal, referred to as the quiescent trigger signal, that starts in a first state (e.g. low) and at some point transitions to a second state (e.g. high) and then stays in that second state. The quiescent logic (e.g. the trigger logic) is also configured to detect a quiescent trigger when it detects a transition of the quiescent trigger signal from the first state to the second state. The quiescent logic (e.g. transition logic) is further configured to, in response to the quiescent trigger being detected (e.g. by the trigger logic), transition the instantiation of the hardware design to a quiescent state. As described above, transitioning the instantiation of the hardware design to a quiescent state may comprise transitioning the instantiation to a state in which it does not receive any new input transaction requests, but the instantiation is allowed to complete any transaction requests that are in progress (e.g. are on the bus).

The following is example System Verilog (SV) code for implementing the first example quiescent logic for a hardware design for a component that is configured to indicate that it is ready to receive a new input transaction request by pulling a handshake valid signal (hsk_valid) high.

| line 1 | logic quiescent_trigger; |
| line 2 | property quiescent_trigger_wont_fall; |
| line 3 | @(posedge clk) ! ($fell (quiescent _trigger)); |
| line 4 | endproperty |
| line 5 | am_quiescent_trigger_wont_fall: assume property (quiescent_trigger_wont_fall); |
| line 6 | property quiescent_trigger_will_rise; |
| line 7 | @(posedge clk) ##[1:$] $rose(quiescent_trigger); |
| line 8 | endproperty |
| line 9 | am_quiescent_trigger_will_rise: assume (quiescent_trigger_will_rise); |
| line 10 | property quiescent_p; |
| line 11 | @(posedge clk) quiescent_trigger |=> ## [0:$] !($rose(hsk_valid)); |
| line 12 | endproperty |
| line 13 | am_std_quiescent: assume property (quiescent_p); |

It will be evident to the person of skill in the art that line 1 of the example code defines a new signal (quiescent_trigger). Lines 2 to 4 define a property (quiescent_trigger_ wont_ fall) that the new signal will not fall (!($fell (quiescent_trigger))). As is known to those of skill in the art, $fell(x) is an SV operator that is used to detect a negative or falling edge. Specifically, $fell(x) compares the previous sample of x to the current sample of x to see if there was a transition from 1 to 0. $fell(x) returns true if a negative or falling edge is detected, and returns false otherwise. In this example the "@(posedge clk)" code specifies that the new signal is sampled on the positive edge of the clock signal (clk).

Line 5 is an assumption statement that specifies that it is assumed that the property defined in lines 2 to 4 (quiescent_ trigger_wont_fall) is true. An assumption statement is interpreted by a formal verification tool as a constraint on the behaviour of an instantiation of a hardware design during formal verification thereof. Specifically, when a property is assumed, formal verification tools constrain the inputs so that the property holds. Therefore assumption statements define an environment in which a property of a hardware design is verified. Accordingly, the assumption statement in line 5 causes a formal verification tool to only verify those states or sequence of states of the hardware design in which the new signal never falls.

Lines 6 to 8 define a property (quiescent_trigger_will_ rise) that the new signal will rise after at least one cycle of being low (##[1 $] $rose(quiescent_trigger))—i.e. the new signal will be low for at least one cycle and some point thereafter it will transition from low to high. As is known to those of skill in the art, $rose(x) is an SV operator that is used to detect a positive or rising edge. Specifically, $rose(x) compares the previous sample of x to the current sample of x to see if there was a transition from 0 to 1. $rose(x) returns true if a positive or rising edge is detected, and returns false otherwise. In this example the "@(posedge clk)" code specifies that the new signal is sampled on the positive edge of the clock signal (clk).

Line 9 is another assumption statement that specifies that it is assumed that the property defined in lines 6 to 8 (quiescent_trigger_will_rise) is true. Accordingly, the assumption statement in line 9 causes a formal verification tool to only verify those states or sequence of states of the hardware design in which the new signal is low for at least one cycle and sometime thereafter rises. The two assumption statements in lines 5 and 9 together causes a formal verification tool to only verify those states or sequence of states of the hardware design in which the new signal starts low and after being low for at least one cycle rises and then once high stays high. Ensuring that the new signal will be low for at least one cycle means that there is at least one cycle in which the quiescent trigger will not occur which may allow the verification to align more closely to real world synchronous designs. It will be evident to a person of skill in the art that this is an example only and that in other examples the new signal may not be forced to be low for any cycles or the new signal may be forced to be low for more than one cycle.

Figure 4:
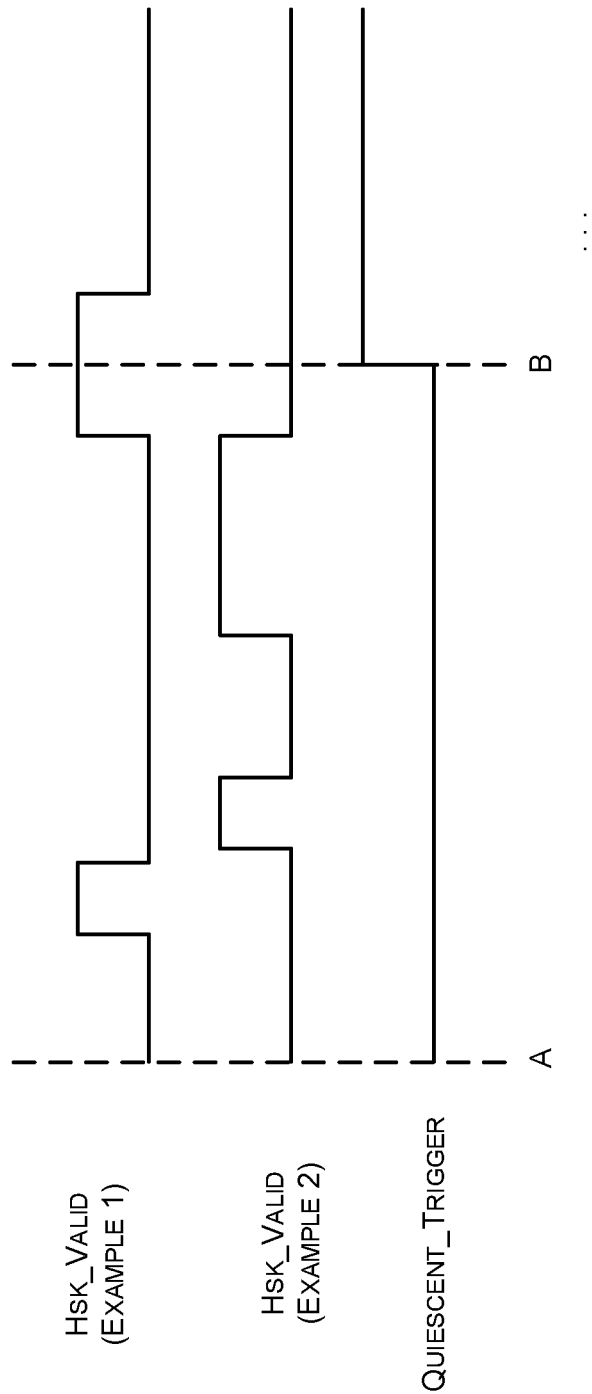
FIG. 4 is a schematic diagram illustrating transitioning an instantiation of a hardware design to a quiescent state in response to a quiescent trigger.

Lines 10 to 12 define a property (quiescent_p) that if the quiescent trigger signal is high that the handshake valid signal of the hardware design will not rise (quiescent_trigger|=>##[0:$] !($rose(hsk_valid))). Line 13 is another assumption statement that specifies that it is assumed that the property defined in lines 10 to 12 (quiescent_p) is true. This assumption statement transitions an instantiation of the hardware design to a quiescent state upon a quiescent trigger being detected. Specifically, if the handshake valid signal (hsk_valid) is high when the quiescent trigger occurs (e.g. when the quiescent_trigger signal goes high) it can stay high, but once it goes low it has to stay low. This is shown in example 1 of FIG. 4. However, if the handshake valid signal (hsk_valid) is low when the quiescent trigger occurs (e.g. when the quiescent_trigger signal goes high) it has to remain low. This is shown in example 2 of FIG. 4. This allows the instantiation of the hardware design to continue to process input transaction requests that are already in progress, but the instantiation will not receive any new input transaction requests.

Since the time at which the quiescent_trigger signal transitions from low to high is not fixed, the quiescent_trigger signal will transition from low to high at a symbolic point in time. This means that this example code, once linked to a hardware design, would cause a formal verification tool to verify a property of the hardware design for the quiescent trigger signal rising at different points in time. For example, it will cause the formal verification tool to verify the property for the hardware design when: the quiescent_trigger signal rises in cycle 1; the quiescent_trigger signal rises in cycle 2; the quiescent_trigger signal rises in cycle 3 and so on.

In this example, lines 1 to 9 of the above code define the trigger logic of the quiescent logic, and lines 10 to 13 define the transition logic of the quiescent logic.

Second Example Quiescent Logic

In a second example the quiescent logic (e.g. trigger logic) is configured to define a first event that occurs in an instantiation of the hardware design, define a second event that occurs in an instantiation of the hardware design, and detect a quiescent trigger has occurred when it detects that the first and second events occur in a predetermined manner with respect to each other. For example, the first event may be a new input transaction request with a first predetermined characteristic and the second event may be a new input transaction request with a second predetermined characteristic. In one example, the first predetermined characteristic may be a payload of A and the second predetermined characteristic may be a payload of B. It will be evident to a person of skill in the art that this is an example only and that any characteristic of an input transaction request may be used to identify the first event and that any characteristic of an input transaction request may be used to identify the second event. The predetermined manner in which the events occur may, for example, be that they occur successively or that they occur within a predetermined number of input transaction requests of each other etc. Accordingly, the quiescent logic (e.g. trigger logic) may be configured to detect a quiescent trigger, for example, when it detects an input transaction request with payload A and an input transaction request with payload B, in succession. In some cases, the quiescent logic may be configured to set a flag when the quiescent trigger is detected.

In this second example the quiescent logic (e.g. transition logic) may be configured to, like the first example, in response to the quiescent trigger being detected (e.g. the quiescent trigger flag being set), transition the instantiation of the hardware design to a quiescent state. As described above, transitioning the instantiation of the hardware design to a quiescent state may comprise transitioning the instantiation to a state in which it does not receive any new input transaction requests, but the instantiation is allowed to complete any transaction requests that are in progress (e.g. are on the bus).

The following is example System Verilog (SV) code for implementing the second example quiescent logic for a hardware design for a component that is configured to indicate that it is ready to receive a new input transaction request by pulling a handshake valid signal (hsk_valid) high.

| line 1 | logic event1_seen, event2_seen; |
| line 2 | logic quiescent_trigger; |

-continued

| line 3 | always @ posedge clk |
| line 4 | if reset |
| line 5 | quiescent_trigger = 0; |
| line 6 | else if ( event1_seen && event2_seen ) |
| line 7 | quiescent_trigger = 1; |
| line 8 | end |
| line 9 | always @ posedge clk |
| line 10 | begin |
| line 11 | if < user-defined condition#1 > event1_seen = 1; |
| line 12 | if < user-defined condition#2> event2_seen = 1; |
| Line 13 | end |
| line 14 | property quiescent_p; |
| line 15 | @(posedge clk) quiescent_trigger \|=> ## [0:$] !($rose(hsk_valid)); |
| line 16 | endproperty |
| line 17 | am_std_quiescent: assume property (quiescent_p); |

It will be evident to the person of skill in the art that line 1 of the example code defines two new signals (event1_seen and event2_seen) and line 2 of the example code defines one new signal (quiescent_trigger).

Lines 3 to 8 specify that upon reset the quiescent_trigger signal is set to zero, and when both the event1_seen and event2_seen signals are set (e.g. are high) then a quiescent trigger has been detected and the quiescent_trigger signal is set to one.

Lines 9 to 13 specify that when a first user-defined condition or event occurs in the instantiation of the hardware design then the event1_seen signal will be set (e.g. set to '1'); and when a second user-defined condition or event occurs in the instantiation of the hardware design the event2_seen signal will be set (e.g. set to '1'). The first and second conditions or events that cause the event1_seen and event2_seen signals to be set may be any detectable event or combination of events in the instantiation of the hardware design. For example, as described above, the first event may be an input transaction request with a first payload and the second event may be an input transaction request with a second payload.

Lines 14 to 17 are identical to lines 10 to 13 of the example code for the first example quiescent logic. Specifically lines 14 to 16 of this example define a property (quiescent_p) that if the quiescent trigger is high that the handshake valid signal of the hardware design will not rise (quiescent_trigger|=>##[0:$] !($rose(hsk_valid))). Line 17 is an assumption statement that specifies that it is assumed that the property defined in lines 14 to 16 (quiescent_p) is true. This assumption statement transitions an instantiation of the hardware design to a quiescent state upon a quiescent trigger being detected. Specifically, if the handshake valid signal (hsk_valid) is high when the quiescent trigger occurs (e.g. when the quiescent_trigger signal goes high) it can stay high, but once the handshake valid signal goes low it has to stay low. However, if the handshake valid signal (hsk_valid) is low when the quiescent trigger occurs it has to remain low. This allows the instantiation of the hardware design to continue to process input transaction requests that are already in progress, but the instantiation will not receive any new input transaction requests.

Since the time at which both event 1 and event 2 will be seen or detected is not fixed, the time at which both event 1 and event 2 will be seen or detected will be symbolic. This means that this example code, once linked to a hardware design, causes a formal verification tool to verify a property of the hardware design for different points in time in which both the first and second events have been seen. For example, it causes a formal verification tool to verify the property for the hardware design when: both events 1 and 2 have been seen by cycle 1; both events 1 and 2 have been seen by cycle 2; both events 1 and 2 have been seen by cycle 3 and so on.

In this example, lines 1 to 13 of the above code define the trigger logic of the quiescent logic, and lines 14 to 17 define the transition logic of the quiescent logic.

Although this second example has been described as an example with an intrusive quiescent trigger (e.g. a quiescent trigger that is based on one or more events that occur in a instantiation of the hardware design), it will be evident that similar code could be used to implement a non-intrusive quiescent trigger (e.g. a quiescent trigger that is based on one or more events that occur in an instantiation of the quiescent logic). For example, instead of having lines 9 to 13 that define events in the instantiation of the hardware design which cause event1_seen and event2_seen to be set, event1_seen and event2_seen may be configured in a similar manner as the quiescent trigger of the first example. For example, they may be initially set to 0 upon a reset and may be otherwise free, meaning that during formal verification the formal verification tool may select when each of event1_seen and event2_seen are set.

System

Figure 5:
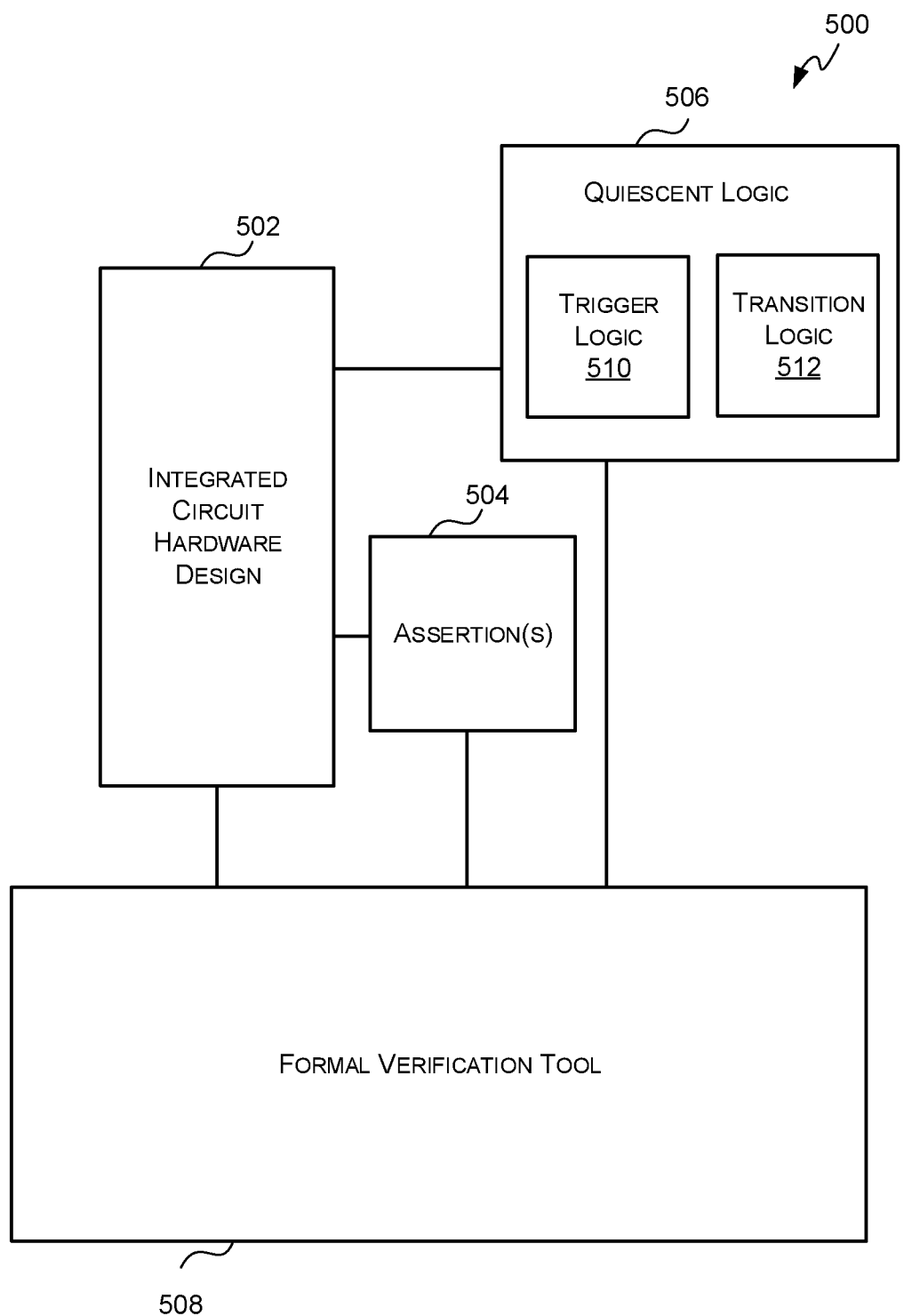
FIG. 5 is a block diagram of an example system for verifying a property of an integrated circuit hardware design using a quiescent state.

Reference is now made to FIG. 5 which illustrates an example system 500 for verifying a property of a hardware design under a constraint that an instantiation of the hardware design will transition to a quiescent state. The system 500 may be implemented by one or more computing-based devices, such as the computing-based device 600 described below with respect to FIG. 6. For example, one or more of the components of the system 500 of FIG. 5 may be implemented as computer readable instructions, which when executed by a computing-based device, cause the computing-based device to perform the functions of the component described below.

The system 500 comprises an integrated circuit hardware design 502; one or more formal assertions 504; quiescent logic 506; and a formal verification tool 508.

As described above, an integrated circuit hardware design is a description of the structure and/or functionality of an integrated circuit which, when processed at an integrated circuit manufacturing system, causes the integrated circuit manufacturing system to generate an integrated circuit described by the hardware design. A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used, such as, but not limited to, proprietary high-level hardware description languages.

As described above, an assertion is a statement that a particular property is expected to hold for the hardware design (i.e. is always true). The assertion(s) 504 comprise one or more assertions, which if verified to be true for the hardware design 502 verify that a particular property is true for the hardware design 502. The property that is verified will be based on the features of the hardware design 502 being verified.

The quiescent logic 506 is a software module configured to, when linked to the hardware design, implement or impose the constraint that an instantiation of the hardware design will enter a quiescent state at a symbolic time. In some cases, the quiescent logic is configured to detect a quiescent trigger that occurs at a symbolic time, and in response to detecting the quiescent trigger, transition the instantiation of the hardware design to a quiescent state (e.g. a state in which the instantiation is not provided any new input transaction requests to process). The quiescent trigger may be any event, or combination of events, in an instantiation of the hardware design or an instantiation of the quiescent logic that is detectable, will definitely occur, and does not have a fixed timing such that the timing of the quiescent trigger is variable (e.g. symbolic). In some cases, the quiescent logic 506 may comprise trigger logic 510 which is configured to monitor one or more control and/or data signals of an instantiation of the hardware design or an instantiation of the quiescent logic and detect a quiescent trigger when it detects, from the monitored control and/or data signal(s) a predetermined event or combination events; and transition logic 512 which is configured to, upon the trigger logic 510 detecting a quiescent trigger, transition the instantiation of the hardware design to a quiescent state.

The assertion(s) 504 and the quiescent logic 506 are linked to the hardware design so that the assertion(s) 504 and the quiescent logic 506 are connected to the relevant signals of the hardware design so as to be able to evaluate the asserted property/properties or to transition an instantiation of the hardware design to a quiescent state. As described above, the assertion(s) 504 and the quiescent logic 506 may be linked to the hardware design 502 by binding the assertion(s) 504 and the quiescent logic 506 to the hardware design or embedding the assertion(s) 504 and the quiescent logic 506 in the hardware design.

As described above, the formal verification tool 508 is a software tool that is capable of performing formal verification of a hardware design. Example formal verification tools were described above.

The hardware design 502, the assertion(s) 504, the quiescent logic 506 and the bindings (if any) are loaded in the formal verification tool 508. The formal verification tool 508 is then configured to formally verify the assertion(s) are true for the hardware design.

When the formal verification tool 508 is used to verify an assertion, the formal verification tool 508 may output an indication of whether or not the assertion is valid (i.e. the asserted property is true for all valid states or sequence of states), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 508 has run out of memory or because the formal verification tool 508 has determined that a certain amount of progress has not been made after a predefined period of time.

When an assertion is not valid or has not been successfully verified, the formal verification tool 508 may also output information indicating a state or sequence of states of the hardware design which causes the assertion to fail (e.g. a counter-example). For example, the formal verification tool 508 may output a trace of the verification indicating at what point, state or sequence of states the failure occurred.

Figure 6:
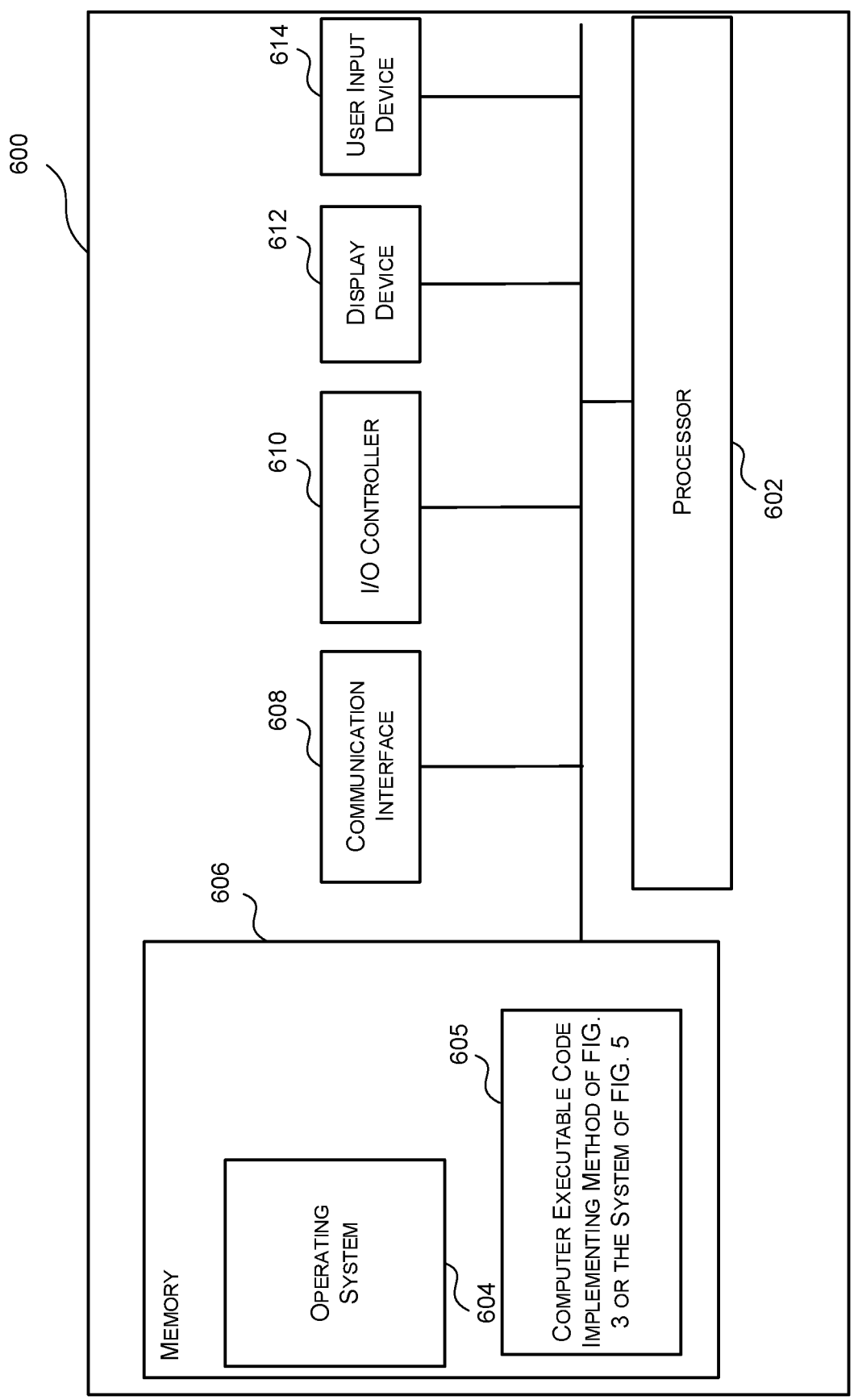
FIG. 6 is a block diagram of an example computing-based device.

FIG. 6 illustrates various components of an exemplary computing-based device 600 which may be implemented as any form of a computing and/or electronic device, and in which embodiments of the methods and systems described herein may be implemented.

Computing-based device 600 comprises one or more processors 602 which may be microprocessors, controllers or any other suitable type of processors for processing computer executable instructions to control the operation of the device in order to verify a property of an integrated circuit hardware design. In some examples, for example where a system on a chip architecture is used, the processors 602 may include one or more fixed function blocks (also referred to as accelerators) which implement a part of the method of verifying a property of an integrated circuit hardware design, in hardware (rather than software or firmware). Platform software comprising an operating system 604 or any other suitable platform software may be provided at the computing-based device to enable application software, such as computer executable code 605 for implementing at least a portion of the method 300 of FIG. 3 or the system 500 of FIG. 5, to be executed on the device.

The computer executable instructions may be provided using any computer-readable media that is accessible by computing-based device 600. Computer-readable media may include, for example, computer storage media such as memory 606 and communications media. Computer storage media (i.e. non-transitory machine-readable media), such as memory 606, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine-readable media, e.g. memory 606) is shown within the computing-based device 600 it will be appreciated that the storage may be distributed or located remotely and accessed via a network or other communication link (e.g. using communication interface 608).

The computing-based device 600 also comprises an input/output controller 610 arranged to output display information to a display device 612 which may be separate from or integral to the computing-based device 600. The display information may provide a graphical user interface. The input/output controller 610 is also arranged to receive and process input from one or more devices, such as a user input device 614 (e.g. a mouse or a keyboard). This user input may be used to initiate verification. In an embodiment the display device 612 may also act as the user input device 614 if it is a touch sensitive display device. The input/output controller 610 may also output data to devices other than the display device, e.g. a locally connected printing device (not shown in FIG. 6).

Figure 7:
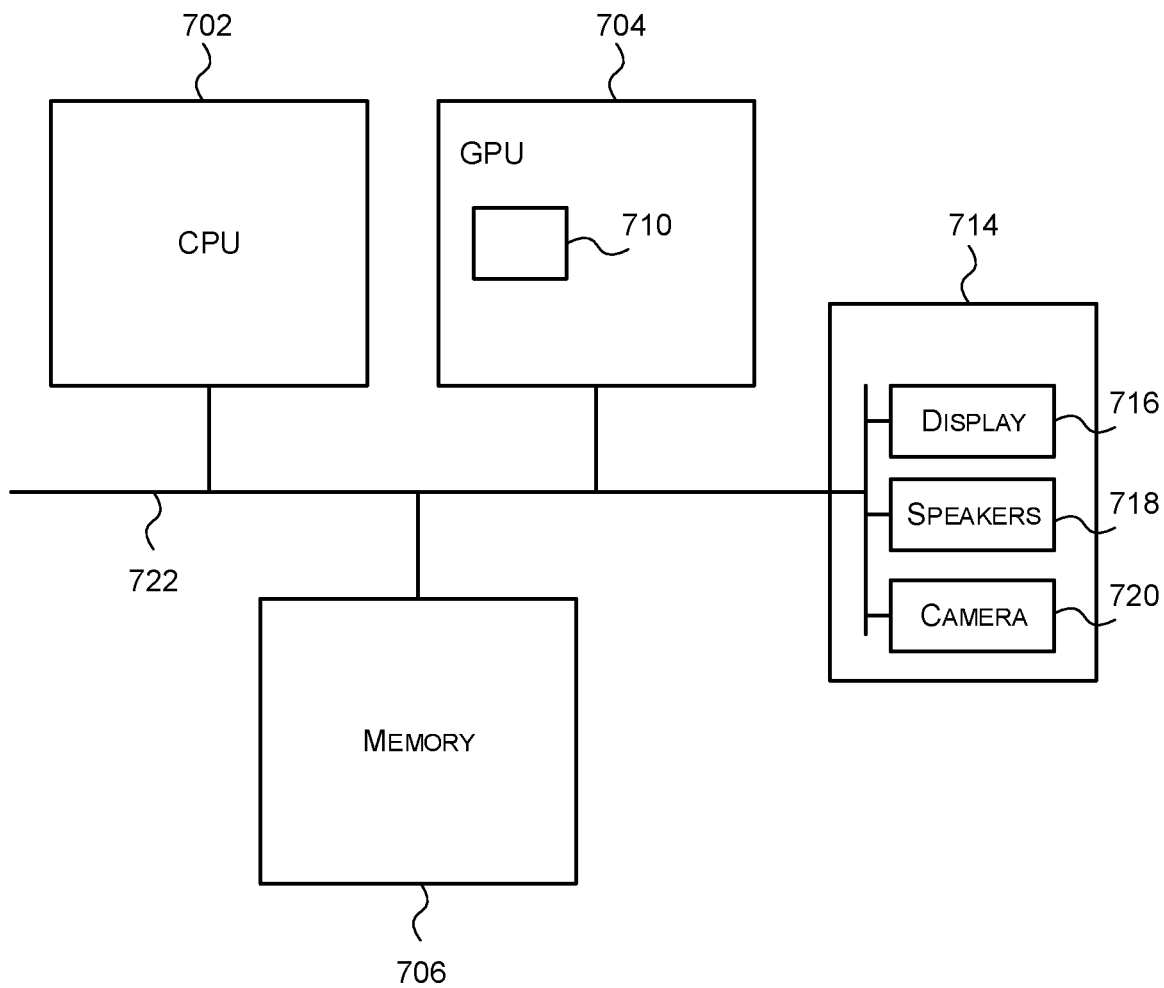
FIG. 7 is a block diagram of an example computer system in which an integrated circuit generated from an integrated circuit hardware design verified by a method and/or system described herein may be implemented.

FIG. 7 shows a computer system in which an integrated circuit generated from an integrated circuit hardware design that has been verified in accordance with a method and/or system described herein may be implemented. The computer system comprises a CPU 702, a GPU 704, a memory 706 and other devices 714, such as a display 716, speakers 718 and a camera 720. An integrated circuit 710 generated from an integrated circuit hardware design that has been verified in accordance with a method and/or system described herein is implemented on the GPU 704. In other examples, the integrated circuit 710 may be implemented on the CPU 702. The components of the computer system can communicate with each other via a communications bus 722.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (e.g. hardware design) that when processed (i.e. run) in an integrated circuit manufacturing system configures the system to manufacture a device (e.g. processor or other computing-based device) comprising any apparatus (e.g. an integrated circuit that has been verified using the method and/or systems described herein) described herein. An integrated circuit definition dataset may be, for example, an integrated circuit description.

Therefore, there may be provided a method of manufacturing, at an integrated circuit manufacturing system, an integrated circuit that has been verified using a method and/or system described herein. Furthermore, there may be provided an integrated circuit definition dataset (e.g. hardware design) that, when processed in an integrated circuit manufacturing system, causes the method of manufacturing an integrated circuit that have been verified using a method and/or system described herein to be performed.

An integrated circuit definition dataset (e.g. hardware design) may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. hardware design) at an integrated circuit manufacturing system so as to configure the system to manufacture an integrated circuit that has been verified using a method and/or system described herein will now be described with respect to FIG. 8.

Figure 8:
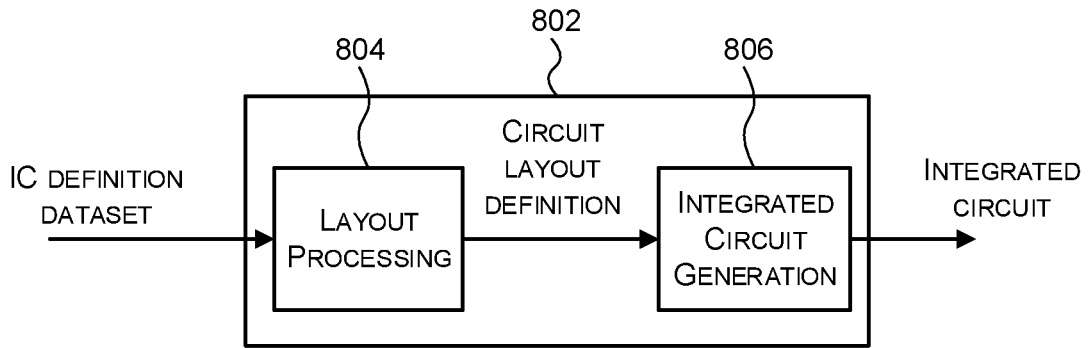
FIG. 8 is a block diagram of an example integrated circuit manufacturing system which may be used to generate an integrated circuit from an integrated circuit hardware design verified by a method and/or system described herein.

FIG. 8 shows an example of an integrated circuit (IC) manufacturing system 802 which is configured to manufacture an integrated circuit that has been verified using a method and/or system described herein. In particular, the IC manufacturing system 802 comprises a layout processing system 804 and an integrated circuit generation system 806. The IC manufacturing system 802 is configured to receive an IC definition dataset, such as a hardware design, process the IC definition dataset, and generate an IC according to the IC definition dataset. The processing of the IC definition dataset configures the IC manufacturing system 802 to manufacture an integrated circuit that implements the function as described in any of the examples herein.

The layout processing system 804 is configured to receive and process the IC definition dataset (e.g. hardware design) to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit that has been verified using a method and/or system described herein without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of verifying a property of an integrated circuit hardware design, the method comprising, at one or more processors:
formally verifying, using a formal verification tool, that the property is true for the hardware design under a constraint that an instantiation of the hardware design transitions to a quiescent state at a symbolic time;
wherein formally verifying that the property is true for the hardware design under a constraint that an instantiation of the hardware design transitions to a quiescent state at a symbolic time comprises:
linking, to the hardware design, one or more assertions which set out the property to be verified;
receiving quiescent logic configured to implement the constraint, the quiescent logic comprising trigger logic configured to detect a quiescent trigger that occurs at a symbolic time, and transition logic configured to, in response to the trigger logic detecting the quiescent trigger, cause the instantiation of the hardware design to transition to a quiescent state, and
linking the quiescent logic to the hardware design prior to formally verifying that the one or more assertions are true for the hardware design.

2. The method of claim 1, wherein the quiescent trigger is an event or a combination of events that: is detectable, will occur, and does not have a fixed timing such that it occurs at a symbolic time.

3. The method of claim 1, wherein the quiescent trigger is an event, or a combination of events, that occur in an instantiation of the quiescent logic.

4. The method of claim 1, wherein the quiescent logic defines a new signal that begins in a first state, and, at the symbolic time, transitions to a second state; and the quiescent trigger is the new signal transitioning from the first state to the second state.

5. The method of claim 4, wherein the quiescent logic comprises an assumption statement that the new signal will not fall and an assumption statement that the new signal will rise.

6. The method of claim 1, wherein the quiescent trigger is an event, or a combination of events, that occur in an instantiation of the hardware design.

7. The method of claim 6, wherein the trigger logic is configured to detect the quiescent trigger by monitoring one or more control signals and/or data signals of the instantiation of the hardware design.

8. The method of claim 1, wherein the hardware design is for a component configured to receive and process input transaction requests, and causing the instantiation of the hardware design to transition to the quiescent state comprises transitioning the instantiation of the hardware design into a state in which the instantiation of the hardware design does not receive new input transaction requests but the instantiation of the hardware design is allowed to process any input transaction requests that have already been received at the instantiation of the hardware design.

9. The method of claim 8, wherein the quiescent logic comprises an assumption statement that when the quiescent trigger occurs the instantiation of the hardware design does not receive any new input transaction requests.

10. The method of claim 8, wherein the hardware design is for a component that is configured to indicate that it is ready to receive a new input transaction request by placing a handshake signal in a predetermined state, and the quiescent logic comprises an assumption statement that once the quiescent trigger occurs the handshake signal is not transitioned to the predetermined state.

11. The method of claim 1, wherein the hardware design is for a component configured to receive and process input transaction requests and the instantiation of the hardware design is in a quiescent state when the instantiation of the hardware design is in a state where the instantiation of the hardware design will not be provided any new input transaction requests.

12. The method of claim 1, wherein the symbolic time is one of a plurality of finite times and the formal verification tool is configured to verify that the property is true when the symbolic time is each of the plurality of finite times.

13. The method of claim 1, further comprising outputting one or more signals indicating whether the formal verification was successful.

14. The method of claim 1, further comprising, in response to determining that the formal verification was not successful, modifying the hardware design to generate a modified hardware design.

15. The method of claim 14, further comprising repeating the formal verification for the modified hardware design.

16. The method of claim 1, further comprising, in response to determining that the formal verification was successful, manufacturing, using an integrated circuit manufacturing system, an integrated circuit according to the hardware design.

17. The method of claim 1, wherein, when processed in an integrated circuit manufacturing system, the hardware design configures the integrated circuit manufacturing system to manufacture an integrated circuit.

18. A system for verifying a property of an integrated circuit hardware design, the system comprising:
memory configured to store:
the hardware design,
one or more assertions, linked to the hardware design, which set out the property to be verified, and quiescent logic, linked to the hardware design, that is configured to implement a constraint that an instantiation of the hardware design will enter a quiescent state at a symbolic time, the quiescent logic comprising trigger logic configured to detect a quiescent trigger that occurs at a symbolic time, and transition logic configured to, in response to the trigger logic detecting the quiescent trigger, cause the instantiation of the hardware design to transition to a quiescent state; and one or more processors configured to formally verify, using a formal verification tool, that the one or more assertions are true for the stored hardware design under the constraint.

19. A non-transitory computer readable storage medium having stored thereon computer readable instructions that, when executed at a computer system, cause the computer system to perform the method as set forth in claim 1.

\* \* \* \* \*